US008259758B2

(12) United States Patent
Chen et al.

(10) Patent No.: US 8,259,758 B2
(45) Date of Patent: Sep. 4, 2012

(54) NETWORK SLAVE NODE AND TIME SYNCHRONIZATION METHOD IN NETWORK APPLYING THE SAME

(75) Inventors: Han-Chiang Chen, Tainan (TW); Shua-Yuan Lai, Yuanli Township, Mialio County (TW)

(73) Assignee: Industrial Technology Research Institute, Hsinchu (TW)

(*) Notice: Subject to any disclaimer, the term of this patent is extended or adjusted under 35 U.S.C. 154(b) by 323 days.

(21) Appl. No.: 12/793,796

(22) Filed: Jun. 4, 2010

(65) Prior Publication Data

US 2011/0150005 A1 Jun. 23, 2011

(30) Foreign Application Priority Data

Dec. 23, 2009 (TW) .............................. 98144579 A

(51) Int. Cl.
*H04J 3/06* (2006.01)
(52) U.S. Cl. ...................................................... 370/503
(58) Field of Classification Search .................. 370/324, 370/350, 395.62, 503–512; 375/354–356; 713/400–600
See application file for complete search history.

(56) References Cited

U.S. PATENT DOCUMENTS

| | | | | |
|---|---|---|---|---|
| 7,447,931 | B1 * | 11/2008 | Rischar et al. ............... | 713/400 |
| 7,848,360 | B2 * | 12/2010 | Gotz et al. ................... | 370/503 |
| 7,916,758 | B2 * | 3/2011 | Sun et al. ..................... | 370/503 |
| 8,018,972 | B2 * | 9/2011 | Roberts et al. ............... | 370/507 |
| 8,081,663 | B2 * | 12/2011 | Tamura ........................ | 370/503 |
| 2004/0233905 | A1 | 11/2004 | Weber | |
| 2004/0246996 | A1 | 12/2004 | Engel | |
| 2006/0048577 | A1 | 3/2006 | Haque et al. | |
| 2006/0109376 | A1 | 5/2006 | Chaffee et al. | |
| 2006/0153245 | A1 | 7/2006 | Schultze | |
| 2006/0251084 | A1 | 11/2006 | Elliot | |
| 2006/0254360 | A1 | 11/2006 | Haque et al. | |
| 2006/0269029 | A1 | 11/2006 | Repko et al. | |
| 2006/0280182 | A1 | 12/2006 | Williams et al. | |
| 2007/0008993 | A1 | 1/2007 | Cha et al. | |

(Continued)

FOREIGN PATENT DOCUMENTS

JP        2009-149956        7/2009

(Continued)

OTHER PUBLICATIONS

English language translation of abstract of JP 2009-149956 (published Jul. 9, 2009).

*Primary Examiner* — Frank Duong
(74) *Attorney, Agent, or Firm* — Thomas|Kayden

(57) ABSTRACT

Provided are a network slave node and a time synchronization method using precision time protocol-like (PTP-like) in a network. The network slave node includes a packet detection unit for detecting whether the slave node receives or sends a synchronization protocol packet and recording a synchronization protocol packet receiving time and a synchronization protocol packet sending time; a hardware clock; and a control unit controlling the packet detection unit and the hardware clock. The control unit reads out the packet receiving time and the packet sending time from the packet detection unit and informs a local master node. The local master node calculates a time offset between the local master node and the slave node, and informs the control unit. The control unit adjusts the hardware clock based on the time offset so that the local master node and the slave node are time synchronized.

24 Claims, 4 Drawing Sheets

U.S. PATENT DOCUMENTS

| | | |
|---|---|---|
| 2007/0011343 A1 | 1/2007 | Davis et al. |
| 2007/0033289 A1 | 2/2007 | Nuyttens et al. |
| 2007/0058929 A1 | 3/2007 | Chaffee |
| 2007/0064851 A1 | 3/2007 | Hall, II |
| 2007/0136410 A1 | 6/2007 | Barford |
| 2007/0159924 A1 | 7/2007 | Vook et al. |
| 2007/0260906 A1 | 11/2007 | Corredoura |
| 2009/0086764 A1* | 4/2009 | Lee et al. ............... 370/503 |
| 2010/0098202 A1 | 4/2010 | Lai et al. |

FOREIGN PATENT DOCUMENTS

| | | |
|---|---|---|
| TW | 201018136 | 5/2010 |

* cited by examiner

NETWORK SLAVE NODE AND TIME SYNCHRONIZATION METHOD IN NETWORK APPLYING THE SAME

This application claims the benefit of Taiwan application Serial No. 98144579, filed Dec. 23, 2009, the subject matter of which is incorporated herein by reference.

TECHNICAL FIELD

The disclosure relates to a network slave node and a precision time synchronization method.

BACKGROUND

In the factory automation control and LXI (LAN eXtension Instrument), the precision time synchronization has to be achieved. In the factory automation control (such as the manufacturing apparatus automation control or the robot arm automation control), in which the precision time synchronization is emphasized, the highest request on the communication time synchronization is the motion control, such as the robot arm control, the motor rotating speed control or the like. The node, such as the robot arm or the motor, and the grand master need to be time synchronized to each other. If the time synchronization is not precise, the product may fail, and the profit is directly influenced and the great loss in the money is caused.

The intranet measurement is adapted to the environment, such as the vehicle automation test production line, the airplane electronic apparatus test, the rocket launching base, or the like. Among these environments, computers, machines and sensing members have to be time synchronized so that the signals returned from the sensing members may be simultaneously measured at the specific time for subsequent data analysis.

The precision time protocol (PTP) may be adopted in the time synchronization of the network. The PTP specifies the best master clock (BMC) algorithm to determine which one node becomes the unique grand master in this network. In this network, all the slave nodes have to be time synchronized with the grand master. The grand master periodically (e.g., every two seconds) requests all slave nodes to be time synchronization for keeping time synchronization.

At present, in the time synchronization process, the slave node has to support the BMC algorithm to determine which is the best clock. In addition, in order to satisfy PTP, the slave node must have an operation system, a microprocessor, a driving device so as to calculate the time deviation between the slave node and the master node. In addition, the slave node still needs to consider the packet sending delay time in time adjustment.

BRIEF SUMMARY

Consistent with the exemplary embodiments of the disclosure, there is provided a network slave node based on a PTP-like (Precise Time Protocol like), and a time synchronization method thereof. The network slave node sends a standard packet, which includes a packet receiving time and/or a packet sending time, to a local master node; and the local master node calculates a time offset between each network slave node and the local master node and sends the time offset to the slave node. The network slave node receives packets from the local master node to update time by itself.

According to a first exemplary embodiment of the disclosure, a precision time synchronization method for a network having a local master node and at least one slave node is provided. The method includes the steps of: outputting a synchronization packet from the local master node to the slave node, and recording, by the local master node, a first time of outputting the synchronization packet; recording, by the slave node, a second time of receiving the synchronization packet when the slave node receives the synchronization packet; adding, by the slave node, the second time to a sync response packet after receiving the synchronization packet, and returning, by the slave node, the sync response packet to the local master node; extracting, by the local master node, the second time from the sync response packet after the local master node receives the sync response packet, so that the local master node establishes a first time difference equation expressing that a difference between the second time and the first time is equal to a time offset plus a packet transmission delay time; sending, by the slave node, a slave sync packet to the local master node, and recording, by the slave node, a third time of outputting the slave sync packet; recording, by the local master node, a fourth time of receiving the slave sync packet after the local master node receives the slave sync packet; sending, by the slave node, a slave node notification packet to the local master node, and adding, by the slave node, the third time to the slave node notification packet; establishing, by the local master node, a second time difference equation expressing that a difference between the fourth time and the third time is equal to the packet transmission delay time minus the time offset, wherein the local master node calculates the time offset between the local master node and the slave node and the packet transmission delay time according to the first and second time difference equations; and outputting, by the local master node, a clock update packet to the slave node, wherein the clock update packet carries the time offset between the local master node and the slave node and the packet transmission delay time, so that the slave node is time synchronized with the local master node after the slave node performs time calibration according to the time offset.

According to a second exemplary embodiment of the disclosure, a slave node coupled to a local master node in a network is provided. The slave node includes a packet detection unit, a hardware clock and a control unit. The packet detection unit detects whether the slave node receives or sends a synchronization protocol packet and records a synchronization protocol packet receiving time and a synchronization protocol packet sending time The control unit is coupled to and controls the packet detection unit and the hardware clock. The control unit reads out the synchronization protocol packet receiving time and the synchronization protocol packet sending time from the packet detection unit, and informs the local master node about the synchronization protocol packet receiving time and the synchronization protocol packet sending time. The control unit receives (1) a time offset between the local master node and the slave node and (2) a packet transmission delay time which are both calculated by the local master node. The control unit adjusts the hardware clock according to the time offset and the packet transmission delay time, so that the slave node and the local master node are time synchronized.

According to a third exemplary embodiment of the disclosure, a precision time synchronization method applied to a slave node connected to a local master node is provided. The method includes the steps of: receiving, by the slave node, a synchronization packet outputted from the local master node at a first time, and recording, by the slave node, a second time of receiving the synchronization packet; returning, by the slave node, a sync response packet containing the second time to the local master node after receiving the synchronization packet, wherein the local master node establishes a first time difference equation expressing that a difference between the second time and the first time is equal to a time offset plus a packet transmission delay time; sending, by the slave node, a slave sync packet to the local master node, and recording, by the slave node, a third time of outputting the slave sync packet, wherein the local master node receives the slave sync packet at a fourth time; sending, by the slave node, a slave node notification packet containing the third time to the local master node, such that the local master node establishes a second time difference equation expressing that a difference between the fourth time and the third time is equal to the packet transmission delay time minus the time offset, the local master node calculates both the time offset between the local master node and the slave node and the packet transmission delay time according to the first and second time difference equations; and receiving, by the slave node, a clock update packet outputted from the local master node, the clock update packet carrying the time offset between the local master node and the slave node and the packet transmission delay time, so that the slave node is time synchronized with the local master node after the slave node performs a time calibration according to the time offset.

It is to be understood that both the foregoing general description and the following detailed description are exemplary and explanatory only and are not restrictive of the disclosed embodiments, as claimed.

DETAILED DESCRIPTION

Figure 1:
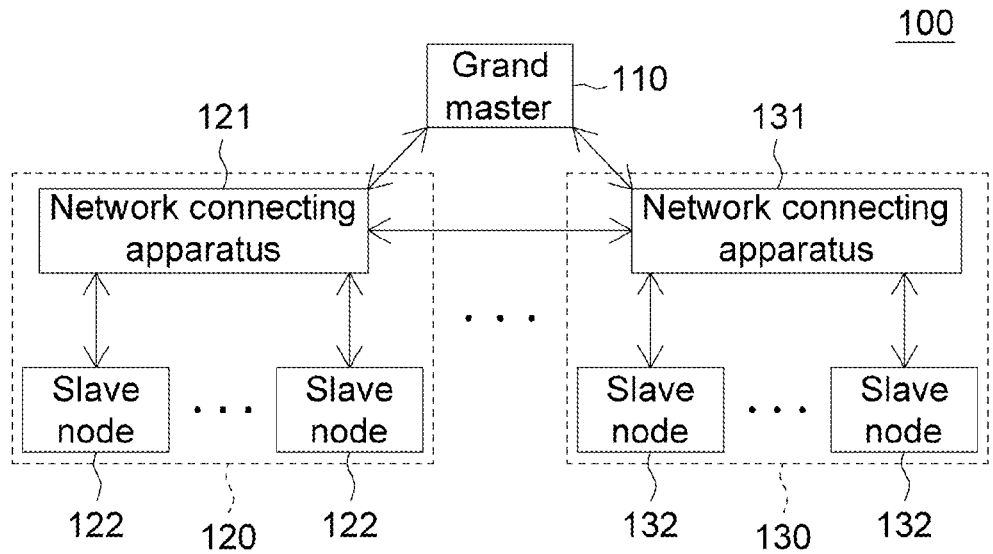
FIG. 1 is a schematic illustration showing a communication system according to an embodiment of the disclosure.

FIG. 1 is a schematic illustration showing a communication system 100 according to an embodiment of the disclosure. Referring to FIG. 1, the communication system (network system) 100 includes a grand master 110 and multiple sub-networks 120 and 130. The sub-network 120 includes a network connecting apparatus 121 and multiple slave nodes 122. The sub-network 130 includes a network connecting apparatus 131 and multiple slave nodes 132. In this embodiment, the sub-network is, for example but without limitation to, a packet network, such as the Internet Protocol (IP) network or the like. The slave node of this embodiment may be applied to the slave node 122 and the slave node 132.

Taking the factory automation environment as an example, these two sub-networks may be regarded as the two factory automation areas.

The grand master 110 and the network connecting apparatuses 121 and 131 support the best master clock (BMC) algorithm and the precision time protocol.

The grand master 110 is always the master node, and the time of the grand master 110 is the standard time of the communication system 100. All network connecting apparatuses, i.e. 121 and 131, in the communication system 100 need to be time synchronized with the grand master 110. The grand master 110 periodically (e.g., every two 2 seconds) outputs a time synchronization request to the network connecting apparatuses 121 and 131, so that the network connecting apparatuses 121 and 131 are time synchronized with the grand master 110. Similarly, the network connecting apparatuses 121 and 131 also periodically output time synchronization requests to all slave nodes (for example 122 and 132), so that all slave nodes are time synchronized with the network connecting apparatuses 121/131. Consequently, it is possible to ensure that all nodes in the communication system 100 are time synchronized.

Regarding the relationships between the network connecting apparatuses 121 and 131 and the grand master 110, the grand master 110 is the master while the network connecting apparatuses 121 and 131 are the slaves. Regarding the relationships between the network connecting apparatus 121/131 and the slave node 122/132, the network connecting apparatuses 121 and 131 are the masters while the slave node 122/132 is the slave.

In this embodiment, the network connecting apparatuses 121 and 131 may be, but without limitation to, a gateway, a router, a switch, a bridge, or the like. In this embodiment, the network connecting apparatuses 121 and 131 have the functions of dispatching, forwarding and switching the packets. The network connecting apparatuses 121 and 131 are to be connected to multiple networks. The communication protocols adopted in the sub-networks 120 and 130 may be the same as or different from each other. In the embodiment of the disclosure, all slave nodes support the PTP-like.

Figure 2:
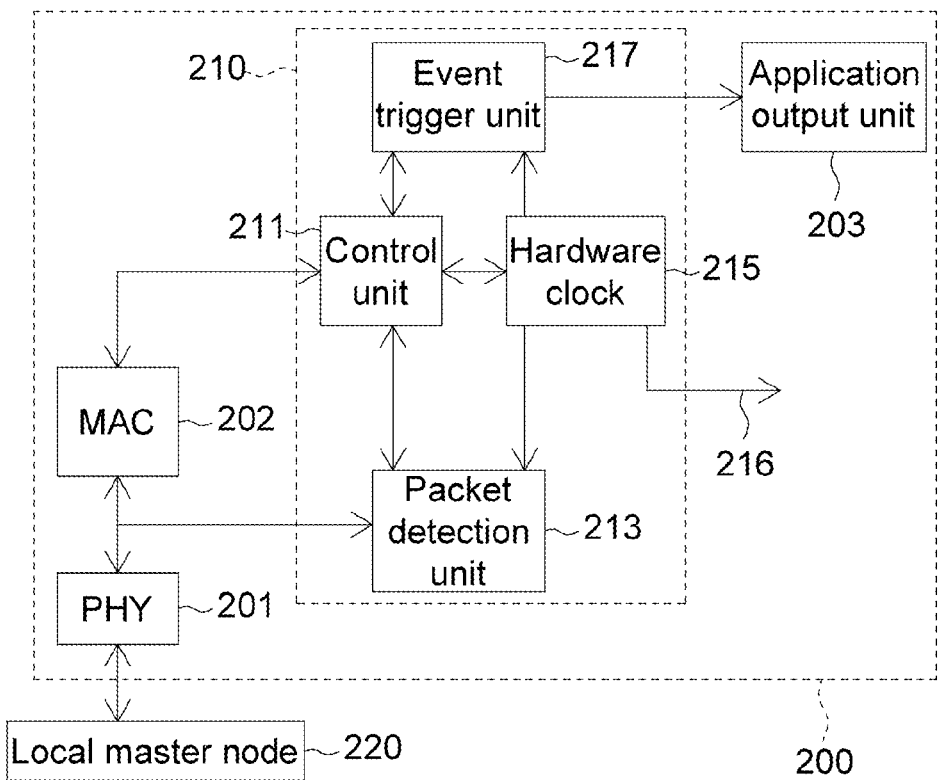
FIG. 2 is a functional block diagram showing a slave node according to the embodiment of the disclosure.

FIG. 2 is a functional block diagram showing a slave node 200 according to the embodiment of the disclosure. As shown in FIG. 2, the slave node 200 (e.g., the slave node 122/132 in FIG. 1) according to the embodiment of the disclosure includes a network physical interface (PHY) 201, a network media access control interface (MAC) 202, an application output unit 203 and a PTP-like executing module 210. The PTP-like executing module 210 includes a control unit 211, a packet detection unit 213, a hardware clock 215 and an event trigger unit 217.

Functions and operations of the network physical interface 201 and the network media access control interface 202 are not particularly restricted.

A local master node 220 is, for example, the network connecting apparatus 121/131 of FIG. 1.

The application output unit 203 is triggered by the event trigger unit 217 in the PTP-like executing module 210 to execute the corresponding operation. For example, the slave node of this embodiment may be combined/incorporated with wireless/wired sensors. If user sets the sensor to sense data at 12:00 pm, then at 12:00 pm, the event trigger unit 217 triggers the sensor to sense data.

The PTP-like executing module 210 judges whether the packet transmitted from the local master node 220 is used for time synchronization, and correspondingly sends packets to the local master node 220.

The control unit 211 controls the packet detection unit 213, the hardware clock 215 and the event trigger unit 217. In addition, the control unit 211 is in charge of completing (generating) packets to be sent to the local master node 220.

The packet detection unit 213 detects packets received by or output from the MAC 202. If this packet relates to the time synchronization operation (i.e., the synchronization protocol packet), the packet detection unit 213 records the time of receiving by or the time of transmitting this packet from the MAC 202 into, for example, an internal register. In detail, the packet detection unit 213 is a synchronization protocol packet detection unit for detecting whether the slave node receives or sends the synchronization protocol packet, and for recording the synchronization protocol packet receiving time and the synchronization protocol packet sending time.

The hardware clock 215 is the clock of the control unit 211. That is, the hardware clock 215 is the clock of the slave node. The hardware clock 215 is, for example, a 1588 hardware clock. In addition, the hardware clock 215 further has a time access interface 216 for sending out the time of the slave node.

The event trigger unit 217 can trigger the application output unit 203 to perform corresponding operations.

Figure 3:
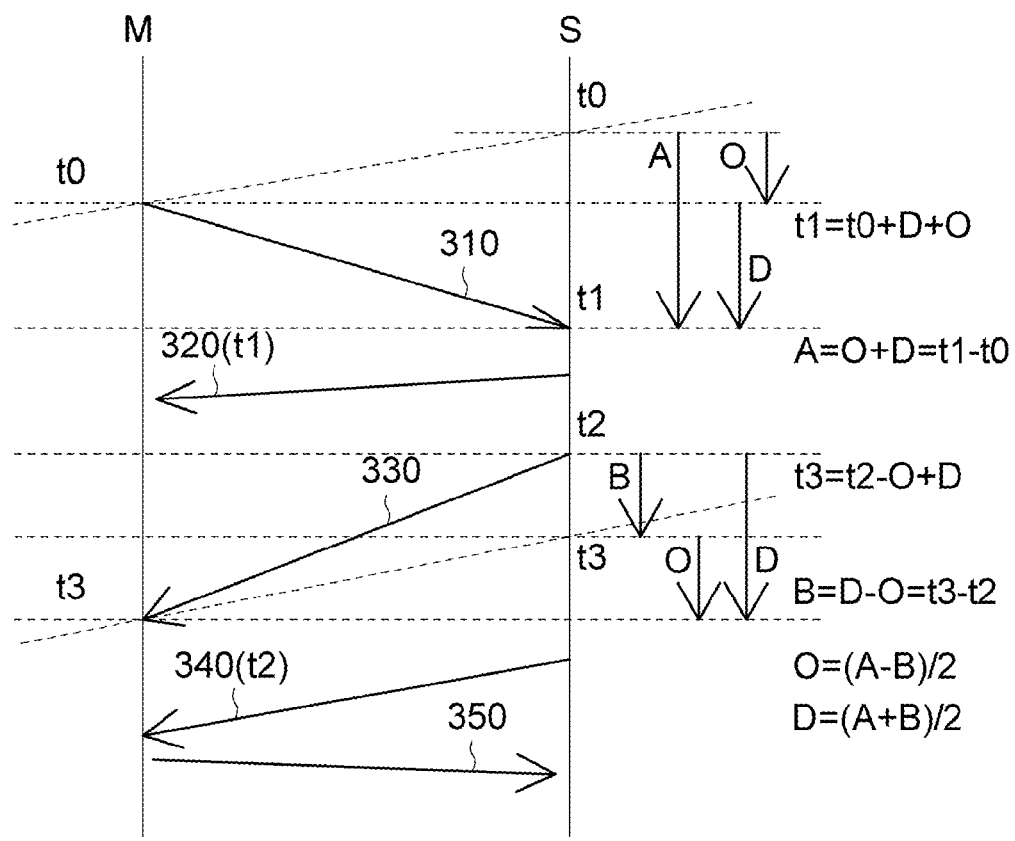
FIG. 3 shows the PTP-like according to the embodiment of the disclosure for achieving precision time synchronization between a local master node and the slave node.

FIG. 3 shows precision time synchronization between the local master node and the slave node according to the embodiment of the disclosure. As shown in FIG. 3, the parameter O represents the time offset between the local master node M and the slave node S. However, before the local master node M and the slave node S send packets to each other, the local master node cannot calculate the real value of the time offset O.

At time t0, the local master node M outputs a sync packet 310 to the slave node S to notify the slave node S that starting of the time synchronization. The local master node M itself records the time t0. When the slave node S receives the synchronization packet 310, the packet detection unit 213 detects whether the packet sent from the local master node M is for the time synchronization operation. If yes, the packet detection unit 213 records the time (t1) of receiving the synchronization packet 310 by the slave node S.

After receiving the synchronization packet 310, the slave node S returns a sync response packet 320 to the local master node M, and the sync response packet 320 carries the time t1 of receiving the synchronization packet 310 by the slave node S. In detail, before the control unit 211 tries to send out the sync response packet 320 through the MAC 202, the control unit 211 reads the packet receiving time t1 from the packet detection unit 213 and adds the packet receiving time t1 to the sync response packet 320.

After the local master node M receives the sync response packet 320, the local master node M extracts the time t1 from the sync response packet 320. So, the local master node M may calculate the parameter A:

$$A = O + D = t1 - t0 \quad (1)$$

The parameter A represents the packet transmission delay time from the time when the local master node M outputs the packet to the time when the slave node S receives the packet, from the view point of the slave node S.

Next, the slave node S sends a slave sync packet 330 to the local master node M, and the slave node S records the packet sending time t2. In detail, when the control unit 211 tries to send out the slave sync packet 330 through the MAC 202, the packet detection unit 213 detects that this packet relates to the time synchronization operation, and the packet detection unit 213 internally records the packet sending time t2.

After the local master node M receives the slave sync packet 330, the local master node M records the receiving time t3.

Thereafter, the slave node S sends out a slave node notification packet 340 to the local master node M, and this packet carries the time t2 of sending out the slave sync packet 330 by the slave node. In detail, because the packet detection unit 213 has recorded the time t2, before the control unit 211 tries to send out the notification packet 340 through the MAC 202, the control unit 211 reads the packet sending time t2 from the packet detection unit 213 and adds the packet sending time t2 to the slave node notification packet 340.

After the local master node M receives the slave node notification packet 340, the local master node M can calculate the parameter B based on the slave node notification packet 340.

$$B = D - O = t3 - t2 \quad (2)$$

The local master node M can obtain the parameters O and D according to Equations (1) and (2).

$$O = (A - B)/2 \quad (3)$$

$$D = (A + B)/2 \quad (4)$$

The local master node M can calculate the time offset O between the local master node M and the slave node S. In addition, the local master node M can further calculate the packet transmission delay time D, for which the local master node M sends the packet to the slave node S, according to Equations (1) to (4).

After the parameters O and D are calculated, the local master node M outputs a clock update packet 350 to the slave node S to notify how the slave node S adjusts time. The clock update packet 350 at least includes the parameters D, O and R. The parameter R is the time offset fluctuation rate representing the fluctuation condition of the parameter O. The slave node S obtains the parameter O (time offset) and the parameter D (packet transmission delay time) from the local master node M through the clock update packet 350. The slave node S adjusts the time of the hardware clock according to the parameter O. In addition, the slave node S further adjusts the time oscillation rate of the hardware clock according to the parameter R if the hardware clock is a quartz oscillator. In detail, the control unit 211 adjusts the hardware clock 215 according to the parameters O and R.

The local master node M calculates the packet transmission delay time D. So, when the hardware clock of the slave node S is adjusted, the precision of time synchronization cannot be affected by the packet transmission delay factor.

Figure 4A:
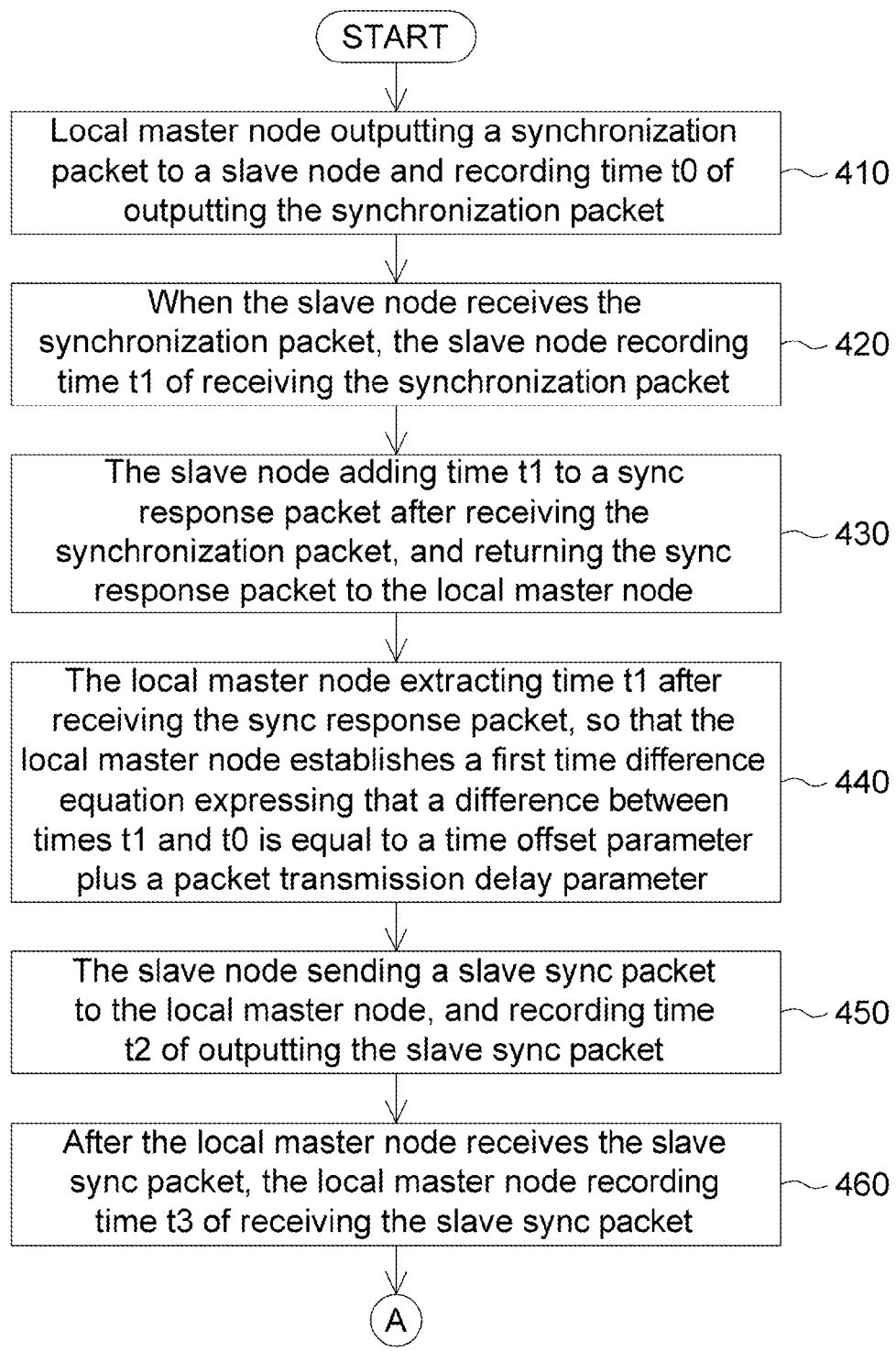
FIG. 4A and 4B show a time synchronization method according to the embodiment of the disclosure.
Figure 4B:
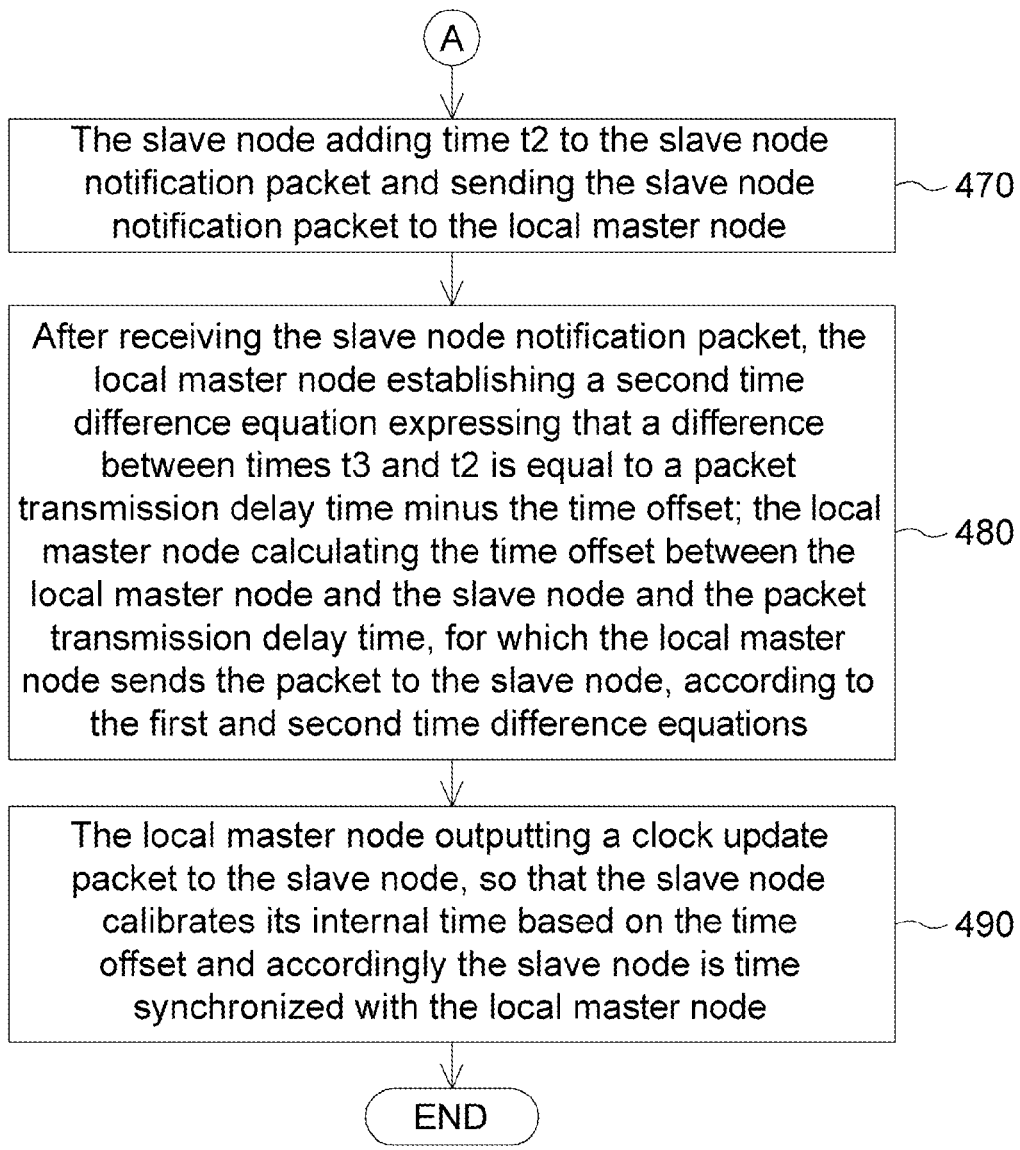

FIG. 4A and 4B show the time synchronization method according to the embodiment of the disclosure. The local master node outputs the synchronization packet to the slave node, and the local master node records the time t0 of outputting the synchronization packet, as shown in step 410.

When the slave node receives the synchronization packet, the slave node records the time t1 of receiving the synchronization packet, as shown in step 420.

After receiving the synchronization packet, the slave node adds the time t1 to the sync response packet and returns the sync response packet to the local master node, as shown in step 430.

After the local master node receives the sync response packet, the local master node extracts the time t1, so that the local master node establishes a first time difference equation expressing that a difference between the second time (t1) and the first time (t0) is equal to a time offset parameter plus the packet transmission delay value, as shown in step 440.

The slave node sends the slave sync packet to the local master node, and the slave node records the time t2 of outputting the slave sync packet, as shown in step 450.

After the local master node receives the slave sync packet, the local master node records the time t3 of receiving the slave sync packet, as shown in step 460.

The slave node sends out the slave node notification packet to the local master node, and the slave node adds the time t2 to the slave node notification packet, as shown in step 470.

After the local master node receives the slave node notification packet, the local master node establishes a second time difference equation expressing that a difference between the fourth time (t3) and the third time (t2) is equal to the packet transmission delay time minus the time offset. The local master node can calculate a time offset between the local master node and the slave node and the packet transmission delay time, for which the local master node sends packets to the slave node, according to the first and second time difference equations, as shown in step 480.

The local master node outputs a clock update packet to the slave node, so that the slave node is time synchronized with the local master node after the slave node adjusts its internal time (i.e., the time of the hardware clock 215) based on the time offset, as shown in step 490. The clock update packet includes the time offset between the local master node and the slave node and the packet transmission delay time.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A precision time synchronization method for a network having a local master node and at least one slave node, the method comprising steps of:
    outputting a synchronization packet from the local master node to the slave node, and recording, by the local master node, a first time of outputting the synchronization packet;
    recording, by the slave node, a second time of receiving the synchronization packet when the slave node receives the synchronization packet;
    adding, by the slave node, the second time to a sync response packet after receiving the synchronization packet, and returning, by the slave node, the sync response packet to the local master node;
    extracting, by the local master node, the second time from the sync response packet after the local master node receives the sync response packet, so that the local master node establishes a first time difference equation expressing that a difference between the second time and the first time is equal to a time offset plus a packet transmission delay time;
    sending, by the slave node, a slave sync packet to the local master node, and recording, by the slave node, a third time of outputting the slave sync packet;
    recording, by the local master node, a fourth time of receiving the slave sync packet after the local master node receives the slave sync packet;
    adding, by the slave node, the third time to a slave node notification packet; and sending, by the slave node, the slave node notification packet to the local master node;
    establishing, by the local master node, a second time difference equation expressing that a difference between the fourth time and the third time is equal to the packet transmission delay time minus the time offset, wherein the local master node calculates the time offset between the local master node and the slave node and the packet transmission delay time according to the first and second time difference equations; and
    outputting, by the local master node, a clock update packet to the slave node, wherein the clock update packet carries the time offset between the local master node and the slave node and the packet transmission delay time, so that the slave node is time synchronized with the local master node after the slave node performs time calibration according to the time offset.

2. The method according to claim 1, wherein the step of recording, by the slave node, the second time of receiving the synchronization packet comprises:
    detecting and analyzing, by the slave node, whether the synchronization packet is for time synchronization when the slave node receives the synchronization packet.

3. The method according to claim 1, wherein the step of adding, by the slave node, the second time to the sync response packet comprises:
    reading, by the slave node, the second time from an internal register before the slave node sends out the sync response packet, and adding the second time to the sync response packet.

4. The method according to claim 1, wherein the step of sending, by the slave node, the slave sync packet to the local master node and recording, by the slave node, the third time of outputting the slave sync packet comprises:
    when the slave node tries to send out the slave sync packet, detecting and analyzing, by the slave node, whether the slave sync packet relates to a time synchronization operation to determine whether to record the third time.

5. The method according to claim 1, wherein the step of sending, by the slave node, the slave node notification packet to the local master node and adding, by the slave node, the third time to the slave node notification packet comprises:
    before the slave node sends out the slave node notification packet, reading, by the slave node, the third time from an internal register and adding the third time to the slave node notification packet.

6. The method according to claim 1, wherein the clock update packet further carries a time offset fluctuation rate parameter representing a fluctuation condition of the time offset.

7. The method according to claim 6, wherein the slave node adjusts a time oscillation rate of an internal hardware clock of the slave node according to the time offset fluctuation rate parameter.

8. A slave node, coupled to a local master node in a network, the slave node comprising:
    a packet detection unit for detecting whether the slave node receives or sends a synchronization protocol packet, and recording a synchronization protocol packet receiving time and a synchronization protocol packet sending time;
    a hardware clock coupled to the packet detection unit; and
    a control unit, coupled to and controlling the packet detection unit and the hardware clock, wherein the control unit reads out the synchronization protocol packet receiving time and the synchronization protocol packet sending time from the packet detection unit, and informs the local master node about the synchronization protocol packet receiving time and the synchronization protocol packet sending time;
    wherein the control unit receives a time offset between the local master node and the slave node and a packet transmission delay time both calculated by the local master node, the control unit adjusts the hardware clock according to the time offset and the packet transmission delay time, so that the slave node and the local master node are time synchronized.

9. The slave node according to claim 8, further comprising:
    an event trigger unit coupled to the hardware clock and the control unit; and an application output unit, coupled to the event trigger unit and triggered by the event trigger unit to perform a corresponding operation.

10. The slave node according to claim 8, wherein:
the slave node receives a synchronization packet outputted by the local master node at a first time, and the local master node records the first time; and
the packet detection unit detects and judges whether the synchronization packet is for a time synchronization operation when the slave node receives the synchronization packet, and the packet detection unit records a second time at the slave node receives the synchronization packet if the synchronization packet is for the time synchronization operation.

11. The slave node according to claim 10, wherein:
the control unit reads out the second time from the packet detection unit after receiving the synchronization packet, adds the second time to a sync response packet, and sends the sync response packet to the local master node.

12. The slave node according to claim 11, wherein:
the local master node extracts the second time after the local master node receives the sync response packet.

13. The slave node according to claim 12, wherein:
the slave node sends a slave sync packet to the local master node, and the packet detection unit records a third time of sending the slave sync packet; and
the local master node records a fourth time of receiving the slave sync packet after the local master node receives the slave sync packet.

14. The slave node according to claim 13, wherein:
before the slave node sends out a slave node notification packet to the local master node, the control unit reads the third time from the packet detection unit and adds the third time to the slave node notification packet.

15. The slave node according to claim 14, wherein:
the local master node accordingly calculates the time offset between the local master node and the slave node after the local master node receives the slave node notification packet;
the local master node outputs a clock update packet to the slave node; and
the control unit adjusts the hardware clock according to the clock update packet.

16. The slave node according to claim 15, wherein:
the clock update packet further carries a time offset fluctuation rate parameter, which represents a fluctuation condition of the time offset; and
the control unit adjusts a time oscillation rate of the hardware clock according to the time offset fluctuation rate parameter.

17. The slave node according to claim 8, wherein the hardware clock further provides a time access interface to send time information of the slave node.

18. A precision time synchronization method for a slave node connected to a local master node, the method comprising the steps of:
receiving, by the slave node, a synchronization packet outputted from the local master node at a first time, and recording, by the slave node, a second time of receiving the synchronization packet;
returning, by the slave node, a sync response packet containing the second time to the local master node after receiving the synchronization packet, wherein the local master node establishes a first time difference equation expressing that a difference between the second time and the first time is equal to a time offset plus a packet transmission delay time;
sending, by the slave node, a slave sync packet to the local master node, and recording, by the slave node, a third time of outputting the slave sync packet, wherein the local master node receives the slave sync packet at a fourth time;
sending, by the slave node, a slave node notification packet containing the third time to the local master node, such that the local master node establishes a second time difference equation expressing that a difference between the fourth time and the third time is equal to the packet transmission delay time minus the time offset, the local master node calculates both the time offset between the local master node and the slave node and the packet transmission delay time according to the first and second time difference equations; and
receiving, by the slave node, a clock update packet outputted from the local master node, the clock update packet carrying the time offset between the local master node and the slave node and the packet transmission delay time, so that the slave node is time synchronized with the local master node after the slave node performs a time calibration according to the time offset.

19. The method according to claim 18, wherein the step of receiving, by the slave node, the second time of the synchronization packet comprises:
detecting and analyzing, by the slave node, whether the synchronization packet is for time synchronization when the slave node receives the synchronization packet.

20. The method according to claim 18, wherein the step of returning, by the slave node, the sync response packet containing the second time to the local master node comprises:
reading, by the slave node, the second time from an internal register before the slave node sends out the sync response packet, and adding the second time to the sync response packet.

21. The method according to claim 18, wherein the step of sending, by the slave node, the slave sync packet to the local master node and recording, by the slave node, the third time of outputting the slave sync packet comprises:
detecting and analyzing, by the slave node, whether the slave sync packet relates to a time synchronization operation when the slave node tries to send out the slave sync packet so as to determine whether to record the third time.

22. The method according to claim 18, wherein the step of sending, by the slave node, the slave node notification packet containing the third time to the local master node comprises:
reading, by the slave node, the third time from an internal register and adding the third time to the slave node notification packet before the slave node sends out the slave node notification packet.

23. The method according to claim 18, wherein the clock update packet further carries a time offset fluctuation rate parameter representing a fluctuation condition of the time offset.

24. The method according to claim 23, wherein the slave node adjusts a time oscillation rate of an internal hardware clock of the slave node according to the time offset fluctuation rate parameter.

* * * * *